Figure 1:
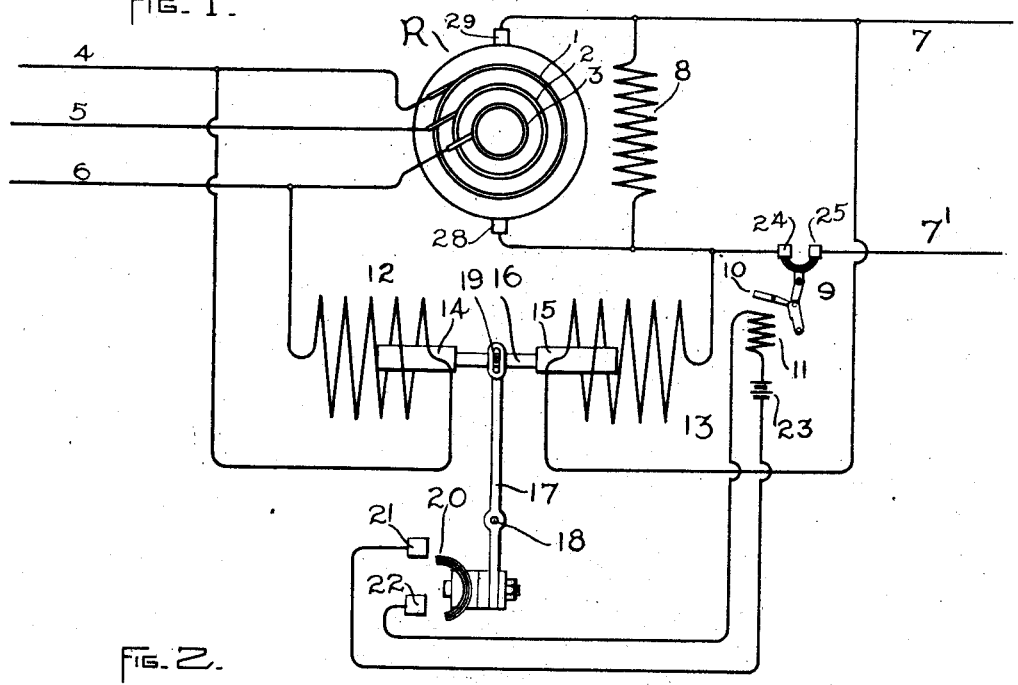

No. 667,113.  
H. W. BUCK.  
SAFETY DEVICE FOR DYNAMO ELECTRIC MACHINES.  
(Application filed Mar. 11, 1899.)  
Patented Jan. 29, 1901.

(No Model.)

WITNESSES.  
Edw. Williams, Jr.  
A. F. Macdonald.

INVENTOR  
Harold W. Buck,  
by Albert G. Davis,  
Atty.

THE NORRIS PETERS CO., PHOTO-LITHO., WASHINGTON, D. C.

UNITED STATES PATENT OFFICE.

HAROLD W. BUCK, OF SCHENECTADY, NEW YORK, ASSIGNOR TO THE GENERAL ELECTRIC COMPANY, OF NEW YORK.

SAFETY DEVICE FOR DYNAMO-ELECTRIC MACHINES.

SPECIFICATION forming part of Letters Patent No. 667,113, dated January 29, 1901.

Application filed March 11, 1899. Serial No. 708,620. (No model.)

*To all whom it may concern:*

Be it known that I, HAROLD W. BUCK, a citizen of the United States, residing at Schenectady, county of Schenectady, State of New York, have invented certain new and useful Improvements in Safety Devices for Dynamo-Electric Machines, (Case No. 1,030,) of which the following is a specification.

Under certain conditions existing in practice rotary converters or similar machines are liable to increase abnormally in speed or to "run away." The most serious danger in this respect exists when the rotary converter is inverted in function and is fed with direct current to be converted into alternating current. Under such conditions the character of the load on the alternating-current mains has a marked effect upon the speed of the machine. Thus if the load be inductive the lagging currents which are produced react upon the field of the machine and weaken the same. The rotary converter with its field thus weakened speeds up in the same manner as a direct-current motor with weakened field, and if the amount of lagging current be sufficient the speed of the machine may get beyond control, so as to seriously endanger the machine from the action of centrifugal force. It also sometimes happens that the alternating supply-mains of a rotary converter are interrupted. If the direct-current end of the rotary converter is connected to an independent circuit, no harm will result. If, however, the direct-current end of the rotary converter be connected with the direct-current end of other rotary converters or, indeed, with any other source of direct current, the immediate result is a reversal of current in the direct-current side of the rotary converter, which thereupon runs as a direct-current motor. If the machine is provided with a series field-winding, as usual, the field strength is reduced by reversal of current through this winding, and the machine therefore speeds up. There are other causes which affect or may affect the speed of a rotary converter; but I have mentioned some of the most serious ones merely by way of illustration of the difficulties met with in practice. It has therefore been found necessary to provide some automatically-actuated means to interrupt the supply of energy to the rotary converter or other machine when its speed rises a predetermined amount above the normal. For this purpose I have provided a device responsive to the frequency of current in the alternating mains, this device acting through suitable coöperating means to cut the converter out of circuit or otherwise diminish its speed.

My invention will be more readily understood in its general nature and details by reference to the following description, taken in connection with the accompanying drawings, while its scope will be particularly pointed out in the appended claims.

Figure 2:
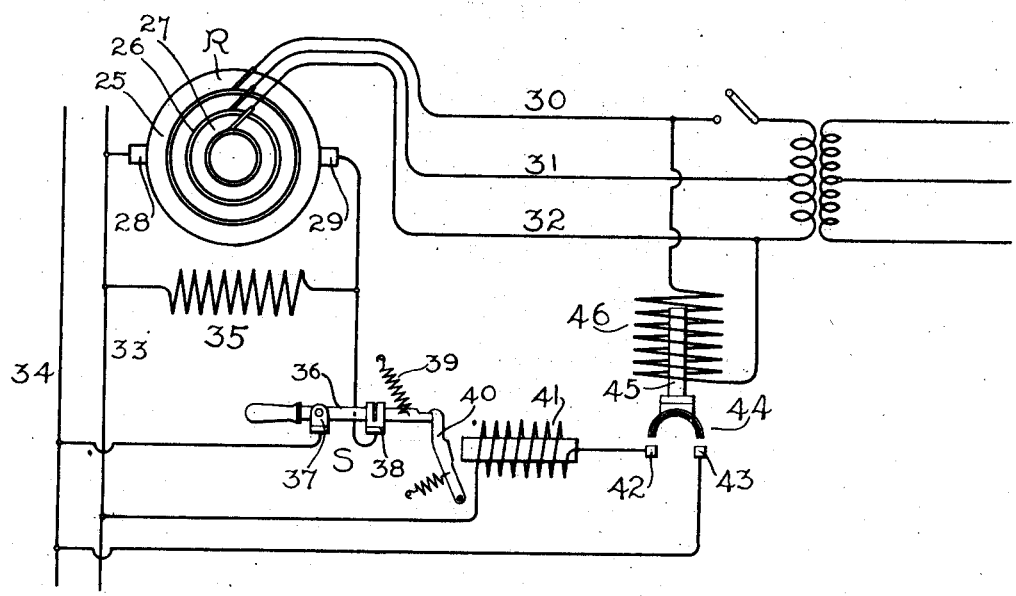

Figures 1 and 2 represent, respectively, different embodiments of my invention.

In Fig. 1 I have indicated a rotary converter at R. The machine is supplied with collector-rings 1 2 3, which are connected through suitable brushes with alternating mains 4 5 6. Direct-current mains 7 7' are in a similar manner connected with the commutator of the converter. I have shown the machine as supplied with a shunt field-winding 8 in the usual manner, and this winding alone may be used, if desired. It will be obvious, of course, that a series winding may be added if automatic regulation is desired. In series with the main 7' of the direct-current side of the converter I have indicated a circuit-breaker 9 of any suitable form, the tripping-lever 10 of the circuit-breaker being operated by current passing through the coil 11 in a local circuit. The means for controlling the flow of current in this local circuit consists, primarily, of two solenoids, one of which (indicated at 12) is connected across two of the alternating mains and the other (indicated at 13) connected across the direct-current mains 7 7'. Within the influence of these two solenoids is located either a single core or two cores 14 and 15, rigidly connected together by a bar 16, as shown. The contact-making lever 17 is suitably pivoted at 18 to a supporting structure, one end of the lever being provided with an elongated slot the walls of which engage a pin 19 on the bar 16, while its other end carries a bridging-contact 20, arranged to operate in conjunction with the fixed contacts 21 and 22, which form the terminals of the local circuit above referred to. This local circuit includes a battery 23 or some other suitable source of electromotive force, and this battery is in series with the coil 11, which by reason of the flow of current therein operates upon the tripping-lever 10 of the circuit-breaker 9, and thus opens the direct-current mains 7 and 7' at the fixed contacts 24 and 25, as will readily be understood. It is of course obvious that the local circuit may be supplied with current from the direct-current mains 7 and 7' instead of from the battery 11. The two solenoids 12 and 13 are so constructed that at normal frequency of the current in the alternating-current mains their effect upon their respective cores 14 and 15 exactly balance each other irrespective of fluctuations in voltage, thus producing no movement of the contact-making lever. Fluctuations in voltage have no effect, since the alternating-current voltage of the rotary converter changes in the same proportion as the direct-current voltage, the one being dependent upon the other. If from any cause, however, the speed of the machine increases, the inductance of the solenoid 12, connected across the alternating mains, increases, thus cutting down the current therein and reducing the pull on its core 14. Since the current in the other solenoid 13, connected across the direct-current mains, remains approximately constant, the contact-making lever 17 is when a certain speed has been reached caused to move to one side of its central position, and the bridging-contact 20 bridges the fixed contacts 21 and 22. The parts are so proportioned that the bridging-contact 20 closes the local circuit when the frequency of current in the alternating mains reaches a predetermined percentage increase in value—as, for instance, twenty per cent. Upon the local circuit being closed current flows through the tripping-coil 11, thus actuating the circuit-breaker or cut-out 9 and so opening the direct-current mains, thus shutting off the supply of energy to the machine and decreasing its speed. If desired, suitable cut-outs or circuit-breakers may be included in the alternating mains and operated from the local circuit simultaneously with the operation of the circuit-breaker 9. This latter construction is desirable in cases where the converter is fed from the alternating-current side, but I have not deemed it necessary to illustrate this obvious change.

In Fig. 2 I have shown a somewhat-different arrangement. As before, R indicates, diagrammatically, a rotary converter having collector-rings 25, 26, and 27 and brushes 28 and 29. The collector-rings are connected to alternating mains 30 31 32, while the brushes are connected one with the direct-current main 33 and the other, through the circuit-breaker or cut-out S, with the other direct-current main 34. Both shunt and series field-windings may be employed on the converter, if desired; but I have in the drawings shown only the shunt-field 35. The circuit-breaker S may be of any suitable construction; but as here shown it consists of a switch-arm 36, suitably pivoted at 37 and making connection with spring-fingers or some other form of fixed contact 38. A spring 39 tends to open the switch, while a spring-actuated latch 40 engages the end of the switch-arm 36 and maintains the circuit closed. The latch 40 is actuated by a magnet 41, included in a normally open circuit, which in this case is shown as connected across the direct-current mains 33 34. The terminals of this circuit are brought to and connected with the fixed contacts 42 43, which are adapted to be closed by the bridging-contact 44, the latter being controlled or carried by or actuated from the core 45 of a solenoid 46, connected in circuit across two of the alternating mains or supplied with current therefrom in any other desired manner. The parts are so arranged that when any amount of current below a predetermined minimum flows in the circuit of the solenoid 46 the bridging-contact 44 will connect the fixed contacts 42 and 43 and so close the circuit through the magnet 41. One manner of accomplishing this purpose consists in arranging the core 45 vertically and opposing the attractive force due to current in the solenoid to the attraction of gravitation. It is obvious that many other modifications might be used—such, for example, as the substitution of the force of a spring for that of gravity.

Under normal operation of the rotary converter the current in the solenoid 46 is sufficient to maintain the bridging-contact 44 away from its coöperating fixed contacts. If for any cause, however, the frequency of the current in the alternating mains were to increase, the inductance of the winding of the solenoid would correspondingly increase, thus weakening the current flowing therein and allowing the bridging-contact 44 to descend. Such a proportioning is chosen that when a predetermined rise in frequency has taken place the bridging-contact 44 will close the circuit through the magnet 41, thus attracting the latch 40 and releasing the end of the switch-lever 36, which by means of the actuating-spring 39 operates to open the direct-current connection of the rotary converter, thus cutting off its supply of energy and reducing its speed. It will of course be obvious that the circuit controlled by the solenoid 46 may be used to actuate circuit-breakers or cut-outs placed in the alternating mains either in addition to circuit-breaker in the direct-current system or to the exclusion of the latter, as may be found desirable.

Having thus described my invention, what I claim as new, and desire to secure by Letters Patent of the United States, is—

1. The combination of alternating-current and direct-current mains, a cut-out in one of said mains, and solenoids connected across the alternating and direct current mains respectively and operating differentially to control said cut-out.

2. The combination of a rotary converter, alternating and direct current mains connected thereto, a cut-out in one of the mains, two solenoids connected across the alternating and direct current mains respectively, and operating differentially to control the said cut-out.

3. The combination of a variable-speed dynamo-electric machine, mains connected thereto which in normal operation carry alternating currents, a circuit connected across the alternating mains and responsive to changes of frequency therein, and a relay device controlled by said circuit and arranged to interrupt the supply of energy to the dynamo-electric machine upon increase in speed.

4. The combination of a dynamo-electric machine provided with collector-rings and a commutator, alternating-current mains connected to the collector-rings and direct-current mains to the commutator, a cut-out in one of the mains, and means for controlling said cut-out responsive only to changes of frequency of the alternating electromotive force.

5. The combination of alternating-current and direct-current mains, a cut-out in one of the mains, and a device for controlling said cut-out acted upon but unaffected by alternating electromotive force of normal frequency, said device being arranged so that change of frequency brings it into operation.

6. The combination of alternating-current and direct-current mains, a cut-out for one of said mains, a local circuit for controlling said cut-out, and a device, for controlling said local circuit, acted upon but unaffected by electromotive force of normal frequency impressed on the alternating mains, said device being arranged so that change of frequency brings it into operation.

7. The combination of a dynamo-electric machine provided with collector-rings and a commutator, alternating-current mains connected to the collector-rings, direct-current mains to the commutator, a cut-out in one of the mains, and means independent of voltage but responsive to frequency of the alternating electromotive force, for controlling said cut-out.

8. The combination of a rotary converter, alternating and direct current mains connected thereto, a cut-out in one of the mains, and means for controlling said cut-out responsive only to changes of frequency of the alternating electromotive force.

9. The combination with a rotary converter, of alternating-current and direct-current mains, a circuit-interrupting device in one of said mains, a local circuit for controlling the circuit-interrupting device, and a circuit, operative upon change of frequency of the electromotive force on the alternating mains but inoperative upon change of voltage, acting to close the local circuit when the frequency of the alternating electromotive force reaches a predetermined value.

In witness whereof I have hereunto set my hand this 9th day of March, 1899.

HAROLD W. BUCK.

Witnesses:
 BENJAMIN B. HULL,
 MABEL E. JACOBSON.